Dec. 18, 1951     C. W. LAND     2,579,118

TWO WHEEL TRAILER AUTOMATIC GUIDE

Filed Feb. 5, 1948     2 SHEETS—SHEET 1

Inventor
Charles W. Land

By *Clarence A. O'Brien and Harvey B. Jacobson*
Attorneys

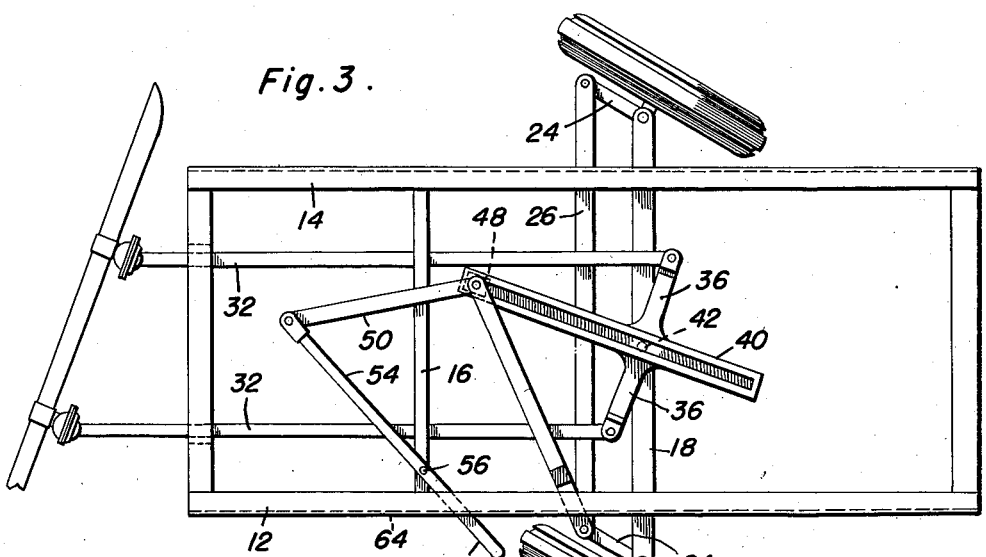
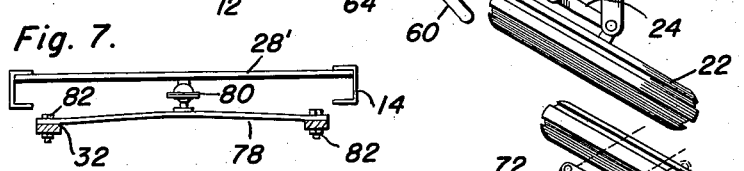
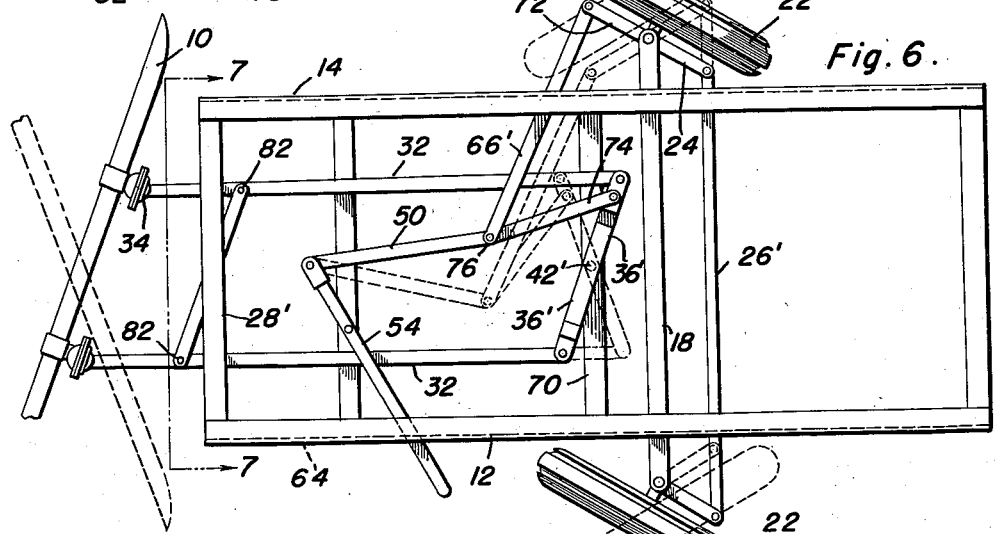
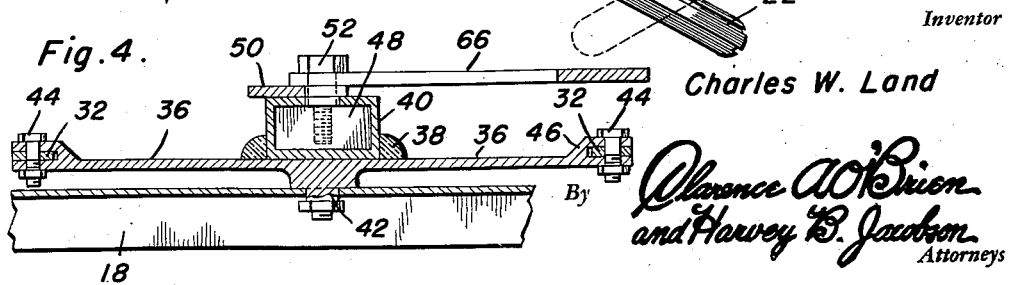
Inventor
Charles W. Land

Patented Dec. 18, 1951

2,579,118

UNITED STATES PATENT OFFICE 2,579,118

TWO-WHEEL TRAILER AUTOMATIC GUIDE

Charles W. Land, Littleton, Colo.

Application February 5, 1948, Serial No. 6,513

4 Claims. (Cl. 280—33.55)

This invention relates generally to steering mechanisms and more particularly, to a steering mechanism for trailers propelled by a towing vehicle and having a pair of inflexible link members connecting said towing vehicle to a cross-arm pivoted on the chassis of the trailer, the said cross-arm being linked to the steering arms of the ground contacting wheels on the trailer.

A primary object of this invention is to provide steering means for trailers which may be used to effect automatic steering of the trailer, without extensive linkage means necessarily secured to the towing vehicle, and without extensive apparatus carried by the trailer.

Another object of this invention is to provide steering means for trailers which may be adjusted to allow the steering of the trailer either in the same direction or in the opposite direction to the direction in which the towing vehicle is turned.

Still another object of this invention is to provide steering means for trailers in which means is incorporated for prevention of rocking and weaving of the trailer when in operation.

Still another object of this invention is to provide trailer steering means which is extremely safe to operate, the different elements of the apparatus being of extreme simplicity and easily inspected and maintained.

And a last object to be specifically mentioned is to provide trailer steering means which is relatively inexpensive and practicable to manufacture, which is extremely convenient and substantially automatic in operation, and which will give generally efficient and durable service.

With these objects definitely in view, together with other objects which will appear hereinafter as this description proceeds, this invention resides in certain novel construction, combination and arrangement of elements and portions as will be hereinafter described in the specification, particularly pointed out in the appended claims, and illustrated in the accompanying drawings which form a material part of this application, and in which:

Figure 3 is a similar view, showing the control lever as positioned when it is desired to move the towing vehicle and trailer in reverse direction;

Figure 4 is an enlarged fragmentary vertical sectional view, taken on the line 4—4 in Figure 1;

Figure 6 is a top plan view of a chassis of a trailer and a rear end portion or bumper of a towing vehicle with a modified form of this invention operatively applied thereto, the control lever in this modified form being shown in one position only, and the positional relationship of the towing vehicle with reference to the trailer, together with the resultant changed positions of other elements in this steering apparatus being shown in dash lines; and Figure 7 is a horizontal transverse sectional view taken on the line 7—7 in Figure 6.

Similar characters of reference designate similar or identical elements and portions throughout the specification and throughout the several views of the drawings.

Figure 1:
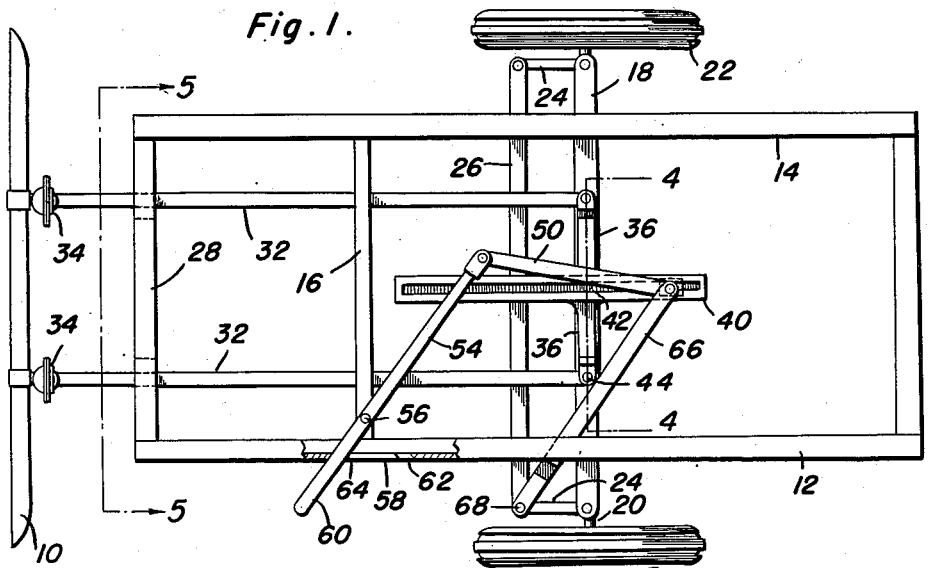
Figure 1 is a top plan view of a trailer chassis, together with the bumper of a towing vehicle, and with this invention operatively applied thereon, portions of one of the lateral members of the chassis being broken away in part to show the means used to secure the control lever selectively in positions for reverse and forward movement of the trailer.

Referring now to the drawings in detail, the environment wherewith this invention is adapted to be used includes a towing vehicle having a bumper or rear end portion 10, and a trailer having a chassis comprising lateral members 12 and 14, cross brace members 16 and 18, the latter supporting stub axles 20 carrying ground contacting wheels 22, as well as steering arms 24 carried by the stub axles 20 and a tie rod 26. The front end transverse member 28 of the chassis has a pair of slot apertures 30 therein positioned in spaced relation and adapted to receive intermediate portions of a pair of inflexible link members 32 which are connected by universal joints 34 to the bumper 10 of the towing vehicle. The insertion of the links 32 through the slots 30 stabilizes the chassis against rocking in one direction, and the slots are preferably so dimensioned and spaced that the links 32 will abut the outside ends of the slots when the trailer and towing vehicle are colinearly disposed, as in Figure 1, thus preventing the trailer from weaving during normal operation. The link members 32 extend rearwardly through the slot apertures 30 for pivotal connection to opposed arms 36 which are rigidly secured as by welding at 38 to a channel member 40. This assembly of arms 36 and channel member 40 is pivoted as at 42 to the cross brace member 18, substantially centrally thereof. The pivotal connection of the inflexible link members 32 with the arms 36 is illustrated in the drawings as including the bolts 44 and throughout the illustration of this invention simple structures will be used to illustrate the principles of construction of this invention. Thus, a bifurcated structure 46 at the outer ends of the arms 36 and the pivot means 42 mentioned above may be altered according to individual preferment and mechanical expediency in implementing this invention.

A sliding block 48 moves freely longitudinally within the channel member 40, and an inflexible link 50 is pivotally secured as at 52 to the block 48, while the other end of the link 50 is pivotally secured to one end of the manual control lever 54. This lever is pivotally mounted on the cross brace 16, as at 56 and a slot 58 is formed in the lateral member 12 to allow the shifting of the outer end 60 of the lever 54. Each end of the slot 58 is formed with an enlargement 62 and 64, so that the lever 54 may be sprung sufficiently to allow the shifting thereof in the slot 58 but will be retained in the enlargement 62 or 64 after such shifting has been made. It will be understood that any suitable means for holding the end 60 of the lever 54 in position may be incorporated with this invention without departure from the spirit thereof and the above described simple slot structure is represented as illustrative rather than limiting.

Another inflexible link 66 is terminally connected to the block 48 and to one of the steering arms 24, the drawings illustrating this link being connected to the outer end of one of these arms by the same pin 68 as is used to connect the tie rod 26 to this particular steering arm.

Figure 2:
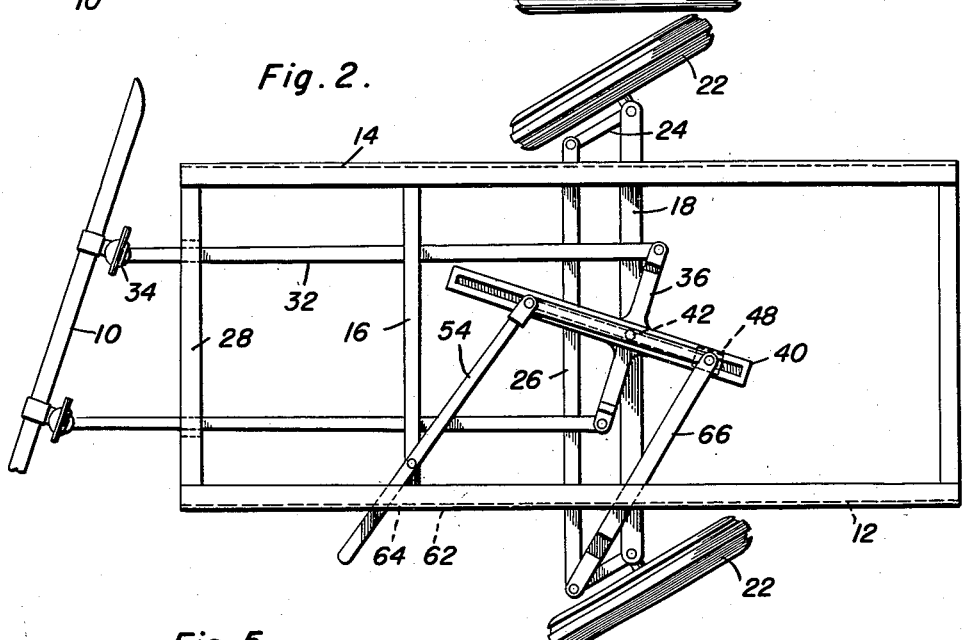
Figure 2 is a similar view of the structure illustrated in Figure 1, but showing this control lever in position as for forward motion of the towing vehicle and trailer, and showing the towing vehicle as turning to the right.
Figure 5:
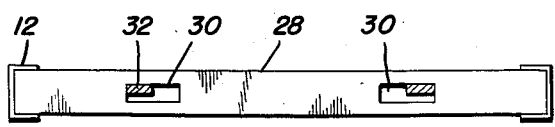
Figure 5 is another vertical sectional view, taken on the line 5—5 in Figure 1.

The above is a complete description of the preferred form of this invention illustrated in Figures 1 to 5, and the operation of this form of the invention will now be briefly referred to, before describing the modified form illustrated in Figure 6. It will be clear that when the towing vehicle is turned as to the right, as illustrated in Figure 2, the inflexible links 32 will cause the channel member 40 to be shifted into the position shown in this Figure 2, that is, when the control lever 54 is in the position illustrated. This action results from the fact that the sliding block 48 is positioned near what may be considered the rear end of the channel member 40. However, when the control lever is moved so that the end 60 thereof is in the enlargement 62, the block 48 is moved to a position adjacent the forward end of the channel member 40, as illustrated in Figure 3. In this position of the lever 54, a turning to the right of the towing vehicle will cause the opposite movement of the ground contacting wheels 22. It will be clear that when it is desired to reverse the trailer, this invention will immediately become extremely valuable in facilitating the backing or reversing, since the trailer may be made to move in accordance with the front wheels of the towing vehicle. Likewise, in forward motion, the invention has great value in providing means whereby the trailer will follow the path of the towing vehicle when the latter is turned, facilitating the negotiation of sharp turns, as in movement through traffic.

Referring now to the modified form illustrated in Figure 6, it will be first noted that the channel member 40 is deleted from this modification. The arms 36' are pivoted as at 42' on a cross-brace 70 of the chassis, while the other connections such as the links 32 and 50 and the connection of the links 32 to the universal joints 34 on the bumper 10, are all unchanged. The links 32 are shiftably supported on the frame member 28', which need not be slotted, by means of a yoke 78 which has a universal joint 80 supporting the yoke centrally of the frame member 28', and the ends of the yoke are pivoted as at 82 to the links 32. In this modified form, one of the steering arms 24 is provided with an extending heel portion 72 and an inflexible link 66' is pivotally connected to the heel extension 72 and the rear end of the link 50, while another link 74 is connected to the same pin 76 as the links 50 and 66', with the rear end of the link 74 being pivoted to an intermediate portion of one of the arms 36'. It will be seen that the link 74 functions, in large measure, to replace the channel member 40 in the sliding block 48.

The operation of the modified form will be reasonably clear from an inspection of Figure 6 and it will be noted that reversal of the direction of turning of the wheels 22 is here again accomplished by an over-center shifting of the rear end pivotal connection of the link 50 so that shifting of the arms 36' will cause the required shifting of the link 66' and the heel extension 72. A tie rod 26' will, as before, cause both wheels 22 to move in unison.

Many minor variations may be made in the exact construction and proportionment of the various elements of this invention, all within the spirit and scope of this application, and this invention should be limited only as determined by a proper interpretation of the terminology used in the subjoined claims.

Having described the invention what is claimed as new is:

1. Steering mechanism for trailers drawn by a towing vehicle and having a chassis, ground contacting wheels and a tie rod and steering arms for said wheels, said mechanism comprising a pair of inflexible links, opposed arms pivoted on said chassis and having the ends thereof pivoted to corresponding ends of said pair of inflexible links, the other ends of said links being pivoted in transversely spaced relation on a towing vehicle, a channel member carried by said opposed arms, a block mounted on said channel member for free sliding movement longitudinally of the channel member, an inflexible link terminally pivoted to one of said steering arms and to said channel member, a lever pivoted at a point intermediate its ends on said chassis and operatively connected with said channel member, said lever being positionable selectively in two positions for over-center adjustment of the cross arm so that turning of the towing vehicle relative to the trailer will cause similarly selective shifting of the steering arms in two corresponding directions, one end of said lever extending to a side of the trailer and selectively securable to the chassis in two positions, said pair of inflexible links having supporting means on said chassis intermediate the lengths of the links to stabilize the trailer against rocking and weaving movement relative to said towing vehicle.

2. A steering mechanism for a trailer drawn by a towing vehicle and having a chassis, ground contacting wheels and a tie rod and steering arms for said wheels, said mechanism comprising opposed arms pivoted on said chassis, a pair of rigid links, ends of said links being pivoted to opposite ends of said opposed arms, the other ends of said links being pivoted in transversely spaced relation on a towing vehicle, a link pivoted at one end to one of said steering arms, means connecting the other end of said link for over-center adjustment on said opposed arms, and a lever movably mounted on said chassis and operatively connected to said link, said lever being positionable with said link selectively in two positions for over-center adjustment of said link on the opposed arms so that turning of the towing vehicle relative to the trailer will cause similar selective shifting of the steering arms in two corresponding directions.

3. A steering mechanism for a trailer drawn by a towing vehicle and having a chassis, ground contacting wheels and a tie rod and steering arms for said wheels, said mechanism comprising opposed arms pivoted on said chassis, a pair of rigid links, ends of said links being pivoted to opposite ends of said opposed arms, the other ends of said links being pivoted in transversely spaced relation on a towing vehicle, said opposed arms having a member rigidly fixed thereto and extending at substantially right angles therefrom, and link means terminally pivoted to said member and to one of said steering arms, a lever pivoted on said chassis and means connecting one end of said lever to said member and said link means, said lever being positionable with said link means selectively in two positions for over-center adjustment of the opposed arms so that turning the towing vehicle relative to the trailer will cause similarly selective shifting of the steering arms in two corresponding directions.

4. A steering mechanism for a trailer drawn by a towing vehicle and having a chassis, ground contacting wheels and a tie rod and steering arms for said wheels, said mechanism comprising opposed arms pivoted on said chassis, a pair of rigid links, ends of said links being pivoted to opposite ends of said opposed arms, the other ends of said links being pivoted in transversely spaced relation on a towing vehicle, said opposed arms having a member rigidly fixed thereto and extending at substantially right angles therefrom, and link means terminally pivoted to said member and to one of said steering arms, a lever pivoted on said chassis and means connecting one end of said lever to said member and said link means, said lever being positionable with said link means selectively in two positions for over-center adjustment of the opposed arms so that turning the towing vehicle relative to the trailer will cause similar selective shifting of the steering arms in two corresponding directions, one end of said lever extending laterally beyond said chassis and constituting a handle adapted to be manually actuated.

CHARLES W. LAND.

REFERENCES CITED

The following references are of record in the file of this patent:

UNITED STATES PATENTS

| Number | Name | Date |
| --- | --- | --- |
| 1,213,440 | Wepplo | Jan. 23, 1917 |
| 1,245,054 | Spencer | Oct. 30, 1917 |
| 1,247,201 | Yoder | Nov. 20, 1917 |
| 2,092,683 | Stidham | Sept. 7, 1937 |